Figure 1:
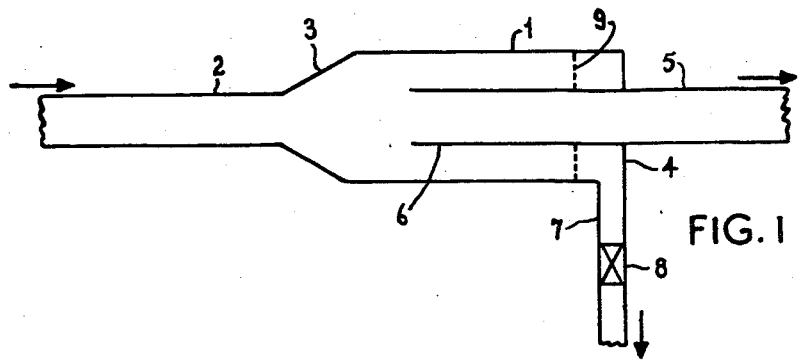

July 5, 1960  S. G. HAWTIN ET AL  2,943,946
MANUFACTURE OF ARTIFICIAL MATERIALS
Filed Sept. 10, 1958

*Inventors*
*Selwyn George Hawtin*
*David Roland Parker*
*John Downing*
By their attorneys Howson and Howson

2,943,946
MANUFACTURE OF ARTIFICIAL MATERIALS

Selwyn George Hawtin, Spondon, David Roland Parker, Newlyn, and John Downing, Kinross, England, assignors to British Celanese Limited, County of London, England, a British company Filed Sept. 10, 1958, Ser. No. 760,166

Claims priority, application Great Britain Sept. 19, 1957

10 Claims. (Cl. 106—196)

This invention relates to a method and apparatus for making and purifying solutions of filament-forming materials.

In making artificial filaments by drying spinning, a solution of a filament-forming substance in a volatile solvent is extruded through a spinning jet containing a number of very small orifices into an evaporative atmosphere in which sufficient of the solvent vapourises to set the extruded filaments. The most important filament-forming substances so employed are the cellulose acetates. Thus acetone solutions of secondary cellulose acetate of acetyl value about 52–56 percent reckoned as acetic acid, and solutions of cellulose triacetate (i.e. cellulose acetates of acetyl value at least 59 percent and preferably 60 percent or more) in methylene chloride or in a mixture of methylene chloride with a lower aliphatic alcohol, may be spun in this way.

It is well known that while dry spinning of cellulose acetate can be carried out continuously for quite long periods, individual filaments do sometimes become broken, and this often necessitates interrupting the spinning to put the matter right. The usual cause of such breakages is a partial blockage of one orifice by a so-called "gel," i.e. an incompletely dissolved particle of cellulose acetate. Such gels are almost invariably present to some extent, especially in the above-mentioned solutions of cellulose triacetate, and to a less extent in the acetone solutions of secondary cellulose acetate, however carefully the solutions are filtered, and the occurrence of these occasional interruptions has therefore been accepted as inevitable.

The present invention provides a means whereby the greater number of the gels in an already filtered spinning solution can be easily removed from the solution, with the result that spinning can be continued for considerably longer periods without interruption.

The invention is based on the discovery that when a solution of a filament-forming material, especially a cellulose acetate, flows along a conduit there is a strong tendency for such gels as it contains to become concentrated near the wall of the conduit, leaving comparatively clean solution in the middle. It has also been discovered that by bleeding-off part of the solution from the zone nearest the wall of the conduit, it is possible to effect a very large reduction in the number of gels in the solution reaching the spinning heads.

According to the present invention therefore a method of obtaining, from a gel-containing solution of a filament forming material, a solution containing a lower proportion of gels, comprises forwarding the solution continuously through a conduit and continuously bleeding off from said conduit a portion only of the solution, said portion being that flowing adjacent to the walls of the conduit, while permitting the remainder to continue along the conduit as a product of reduced gel content.

The invention is of particular importance in connection with solutions of filament-forming materials in organic solvents therefor, for example solutions of cellulose acetates containing 10 to 30 percent of the cellulose acetate by weight. As already indicated the invention is particularly important in connection with spinning solutions for dry spinning, in which process the presence of gels in the spinning solution causes most trouble, and is of particular value in connection with spinning solutions of cellulose acetates, especially solutions of cellulose triacetate in mixtures of methylene chloride with methyl or ethyl alcohol.

The proportion of the solution which is bled-off may vary over a considerable range, but is preferably at least 5 percent of the total, e.g. between 5 percent and 15 percent or 20 percent. It is of course desirable on economic grounds not to bleed-off more than is necessary to obtain the desired result, and in the case of a spinning solution, the optimum proportion will therefore vary in accordance with the quality of the spinning solution and the spinning conditions, for example the size of the orifices and the temperature at which the solution is extruded. The fraction of the solution which is bled-off need not be wasted, since it may be recycled to a mixer in which the solution is being made from filament-forming material and solvent, when it will usually happen that most, if not all, of the gels which it contains will dissolve.

In the case of a dry spinning system comprising a mixer for preparing the solution and a main filter from which the solution is fed to the spinning machine, the gel-containing fraction of the solution may be bled-off in the manner indicated at any convenient point after the main filtration. It is a usual practice to supply a considerable number of spinning heads from a single header, which may terminate at the last spinning head, or may be arranged so that spinning solution flows continuously round a circuit of which the header forms a part, the latter arrangement usually being preferred. In either case good results may be obtained by positioning the bleed-off means or "gel trap" in the header before the solution reaches the first spinning point, or between the main filter presses and the header.

The invention includes a device or gel-trap suitable for bleeding-off solution in accordance with the foregoing procedure. The device comprises a tubular body portion having an entrance for solution at the rearward end, a main outlet tube extending within the said tubular body portion and having its inlet end at a point away from the entrance but short of the forward end of the body portion, said inlet end facing rearwards and being spaced away from the periphery of the body portion, and a secondary outlet, at a point forward of the inner end of the main outlet, for rejection of solution.

The tubular body portion may be cylindrical and the inlet coaxial therewith and merging into the body portion via a divergent conical portion. The main outlet tube may also be cylindrical and coaxial with the body and having its inner end extending rearwards within the body portion; the secondary outlet (for bleeding-off solution) may then be disposed at a point forward of the inner end of the main outlet tube. The diameter of the cylindrical body portion may be from 1.5 to 2.5 times the diameter of the inlet tube while the main outlet tube may be of about the same diameter as the inlet tube. The cross sectional area of the body position may thus be from $(1.5)^2$ to $(2.5)^2$, i.e. from 2.25 to 6.25 times the cross sectional area of the outlet tube. In this arrangement that part of the solution which has been flowing nearest to the wall of the body portion passes into the annular space between that wall and the rearwardly extending outlet tube, while the remainder of the solution passes on through the outlet tube. The rate at which the "trapped" liquid is withdrawn from the annular space can be controlled by means of a valve placed in a pipe-line leading from it, through which this part of the solution can be recycled for incorporation in fresh solution as already described.

The invention also includes a system suitable for preparing a solution of low gel content from an organic filament-forming material and an organic solvent therefor, the said system comprising a mixer for effecting mixing and solution of the filament-forming material in the organic solvent, a filter press, and a gel trap of the kind described above, means for forwarding the solution through the filter press to the inlet of the trap, and means for withdrawing solution from the secondary outlet of the device and returning it to the mixer.

Figure 2:
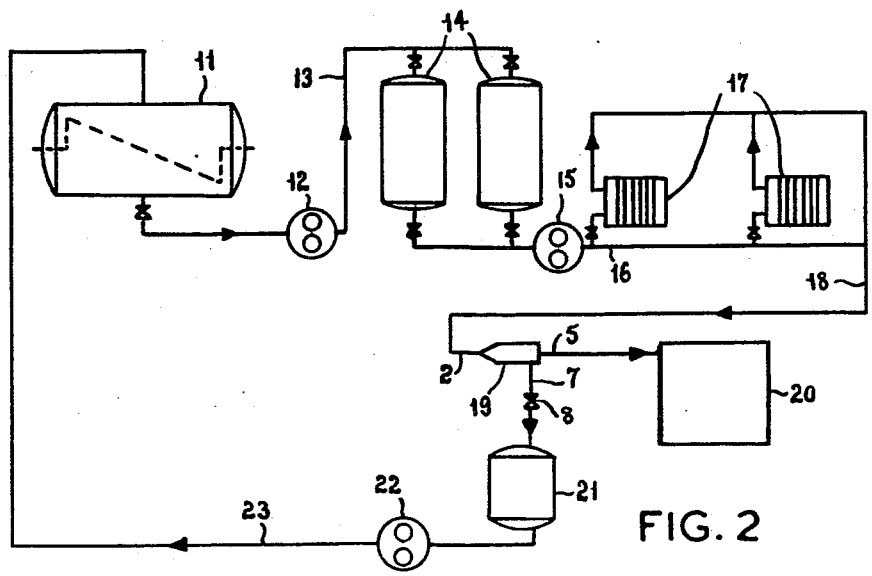

The invention will now be more specifically described with reference to the accompanying drawings in which Fig. 1 shows a device or gel-trap in accordance with the invention while Fig. 2 shows in diagrammatic form a system utilising the gel trap of Fig. 1 and suitable for preparing solutions of organic filament-forming materials in organic solvents therefor.

Referring to Fig. 1, the gel trap comprises a body portion 1, having a coaxial inlet pipe 2 merging into it via a conical portion 3. The body portion is provided at the forward end with a closure 4, through which passes the main outlet tube 5, which is coaxial with the body portion 1 and inlet pipe 2, and has its inlet end 6 extending rearwardly into the body portion. A secondary outlet 7 with a control valve 8, provides for bleeding-off a portion of a solution flowing through the device. The annulus between the body 1 and the outlet tube 5 may be provided with a perforated transverse plate 9 for the purpose of rendering more uniform the flow through the annulus.

Referring to Fig. 2 the system comprises a mixer 11 for dissolving filament-forming material in organic solvent to form a solution. The latter is delivered by a pump 12 and line 13 to storage vessels 14 and then by a pump 15 and line 16 to filter presses 17. From the filter presses the solution passes by a line 18 to the inlet 2 of the gel trap, generally indicated at 19, which is of the construction shown in Fig. 1. Solution of reduced gel content leaves the gel trap 19 by the main outlet 5 and may pass from there directly to a dry spinning machine generally indicated at 20. Solution bled from a zone adjacent ot the walls of the gel trap 19 leaves by the secondary outlet 7 and control valve 8 to a storage tank 21 from which it may be returned by the pump 22 and line 23 to the mixer 11.

The following example provides an illustration of the value of the invention.

*Example*

A solution of cellulose acetate of acetyl value 61 percent was being dry spun using a spinning machine in which a number of spinning heads were fed from a circulating header. The spinning machine was fed in the manner shown in Fig. 2 of the drawings. The concentration of cellulose acetate in the solution was about 21 percent by weight and the solvent a mixture of methylene chloride and methyl alcohol in the ratio of 93 to 7 by weight. Experiments were carried out to determine the average weight of yarn which could be spun without spinning orifice blockage. The diameter of the body portion 1 of the gel trap 19 was twice that of the inlet and main outlet tubes 2 and 5, the bleed-off valve 8 being adjusted so that about 10 percent of the spinning solution was bled-off by means of the trap and recycled to the mixer. Similar experiments were made without the gel trap. Observations made over a long period showed that the average weight of yarn produced between interruptions due to the blocking of an orifice was doubled by the use of the gel trap.

Various modifications of the specific embodiments of the invention described above may be made. For example there may be used two or more gel traps arranged in series, preferably adjusted so that altogether from 5–20 percent of the solution is bled-off; the proportions of the solution bled-off by the individual traps may then be approximately the same, or they may be different. Again if desired the solution bled-off by the gel trap or traps may itself be passed through another gel trap or traps before it is recycled, so as still further to concentrate the gels, and in this case the fraction of the original solution represented by the final bleed-off may be small enough to be discarded.

It sometimes happens that spinning solutions, even after they have been filtered, contain occasional particles of non-cellulosic material derived for example from the material of the conduit walls and other metal surfaces with which they come into contact. This can present difficulties, especially when spinning solutions of cellulose triacetate in methylene chloride or a mixture of methylene chloride with a minor proportion of a lower aliphatic alcohol such as methanol, ethanol, or isopropanol or a butanol, since such solutions are in general more corrosive than are acetone solutions of secondary cellulose acetate. It is a further advantage of the present invention that such impurities, like the gels, are to a large extent removed by the gel trap, and although when the trapped solution is recycled they will naturally not dissolve, they will be held up on the main filters.

Although dry spinning processes are particularly sensitive to the adverse effects of gels, and the invention is therefore of great value in connection with them, it may be applied also to wet spinning processes, and to other processes in which it is useful to reduce the number of gels in a cellulose acetate or other solution. Such processes include the manufacture of foils and films, in which the presence of gels in the solution may seriously affect the clarity of the finished product.

What we claim is:

1. The method of obtaining, from a solution of a cellulose acetate which solution contains gels, a solution containing a lower proportion of gels, which comprises forwarding the solution continuously through a conduit and continuously bleeding-off from said conduit a portion only of the solution, said portion being that flowing adjacent to the walls of the conduit, while permitting the remainder to continue along the conduit as a product of reduced gel content.

2. Method according to claim 1, wherein the rate of bleeding-off solution flowing adjacent to the walls of the conduit is from 5 to 20 percent of the in-flow.

3. Method according to claim 1, wherein the bleeding-off is effected in the direction of flow of solution through the conduit.

4. Method according to any of claim 1, wherein the solution is one of cellulose triacetate in a mixture of methylene chloride and an alkanol containing at most two carbon atoms.

5. A method of forming a solution of a cellulose acetate in a volatile solvent, said solution being of low gel content, which comprises dissolving the cellulose acetate in the volatile solvent at a dissolving station, filtering said solution, forwarding said solution continuously through a conduit, withdrawing a portion only of the solution from the conduit, said portion being that flowing adjacent to the walls of the conduit, while permitting the remainder of said solution to proceed onwards as a product of reduced gel content, and returning the withdrawn portion of solution to the dissolving station and there mixing it with fresh cellulose acetate and volatile solvent to form further solution.

6. Method according to claim 5, wherein the cellulose acetate is cellulose triacetate and the volatile solvent is a mixture of methylene chloride and an alkanol containing at most two carbon atoms.

7. A device suitable for obtaining from a gel-containing solution of a cellulose acetate a solution containing a lower proportion of gels, which comprises a tubular body portion having an entrance for solution at the rearward end, a main outlet tube extending within the said tubular body portion and having its inlet end at a point away from the entrance but short of the forward end of the body portion, said inlet end facing rearwards and being spaced away from the periphery of the body portion and the cross sectional area of the body portion being from 2.25 times to 6.25 times the cross sectional area of said inlet, and a secondary outlet, at a point forward of the inner end of the main outlet, for rejection of solution.

8. A device suitable for obtaining from a gel-containing solution of a cellulose acetate, a solution containing a lower proportion of gels, which comprises a cylindrical tubular body portion, said body portion having (1) a coaxial inlet tube at the rearward end, said inlet tube merging into the body portion via a divergent conical portion, (2) a cylindrical main outlet tube at the forward end and coaxial with the body portion, said outlet tube extending rearwards within the body portion and the cross sectional area of the body portion being from 2.25 times to 6.25 times the cross sectional area of the outlet tube, and (3) a secondary outlet disposed to reject solution from a point forward of the inner end of the main outlet.

9. A device according to claim 8 wherein the inlet tube and main outlet tube are of substantially the same diameter and the diameter of the body portion is from 1.5 to 2.5 times the diameter of the outlet tube.

10. A system suitable for preparing a solution of low gel content from a cellulose acetate and an organic solvent therefor, said system comprising a mixer for effecting mixing and solution of the cellulose acetate in the organic solvent, a filter press, and a device claimed in claim 7, means for forwarding the solution through the filter press to the inlet of the device, and means for withdrawing solution from the secondary outlet of the device and returning it to the mixer.

References Cited in the file of this patent

UNITED STATES PATENTS

| | | |
|---|---|---|
| 1,895,192 | Kampf | Jan. 24, 1933 |
| 2,858,228 | Hughes | Oct. 28, 1958 |
| 2,858,229 | Hughes | Oct. 28, 1958 |